United States Patent
Wang

(10) Patent No.: US 11,531,567 B2
(45) Date of Patent: Dec. 20, 2022

(54) COMPUTING SYSTEM WITH MESSAGE ORDERING MECHANISM AND METHOD OF OPERATION THEREOF

(71) Applicant: TeleNav, Inc., Santa Clara, CA (US)

(72) Inventor: Liang Wang, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 17/306,903

(22) Filed: May 3, 2021

(65) Prior Publication Data

US 2022/0350649 A1 Nov. 3, 2022

(51) Int. Cl.
| | |
|---|---|
| *G06F 9/48* | (2006.01) |
| *G06F 9/54* | (2006.01) |
| *G05D 1/02* | (2020.01) |
| *G05B 19/4155* | (2006.01) |

(52) U.S. Cl.
CPC ....... *G06F 9/4881* (2013.01); *G05B 19/4155* (2013.01); *G05D 1/0212* (2013.01); *G06F 9/542* (2013.01); *G05B 2219/41329* (2013.01)

(58) Field of Classification Search
None
See application file for complete search history.

(56) References Cited

U.S. PATENT DOCUMENTS

| | | | |
|---|---|---|---|
| 5,903,617 A | 5/1999 | Kamalski | |
| 6,073,062 A | 6/2000 | Hoshino et al. | |
| 7,353,054 B2 | 4/2008 | Haney | |
| 9,093,133 B2 | 7/2015 | Mangano et al. | |
| 9,721,626 B2 | 8/2017 | Krone | |
| 2007/0055118 A1 | 3/2007 | Haney | |
| 2011/0004511 A1 | 1/2011 | Reich | |
| 2014/0185390 A1 | 7/2014 | Mangano et al. | |
| 2014/0350840 A1 | 11/2014 | D'Argenio et al. | |
| 2016/0131697 A1 | 5/2016 | Krone | |
| 2017/0299402 A1* | 10/2017 | Hansen | H04W 4/024 |
| 2018/0013211 A1* | 1/2018 | Ricci | H04W 12/04 |
| 2020/0159685 A1* | 5/2020 | Askeland | G06F 11/34 |
| 2020/0250981 A1* | 8/2020 | Kazemi | G05D 1/0088 |
| 2020/0298797 A1* | 9/2020 | Shin | B60R 25/1004 |

* cited by examiner

*Primary Examiner* — Charles E Anya
(74) *Attorney, Agent, or Firm* — Perspectives Law Group, Corp.

(57) ABSTRACT

A method of operation of a computing system includes: transmitting an operational request; receiving an instruction event in response to the operational request; identifying an ordered sequence of the instruction event; loading an event hub with the ordered sequence of the instruction event; and executing the ordered sequence of the instruction event by a functional application including controlling the operation of a device.

17 Claims, 5 Drawing Sheets

COMPUTING SYSTEM WITH MESSAGE ORDERING MECHANISM AND METHOD OF OPERATION THEREOF

TECHNICAL FIELD

An embodiment of the present invention relates generally to an automotive computing system, and more particularly to an automotive computing system for managing message priority and sequencing.

BACKGROUND

As autonomous or driver assisted vehicles become more prevalent, the management of control messages between a server and a client vehicle can become a difficult task. Many of the operations that we take for granted in driver controlled vehicles must be delivered, ordered, and executed. As the server load increases while servicing hundreds or thousands of the autonomous vehicles, the more complex portions of the operation may be delivered out of order with the simpler operations. This can present priority problems that the controller of the autonomous vehicle is not prepared to address.

Today's vehicles can be considered a rolling server farm. There are information and entertainment systems, motor control and operation systems, collision avoidance systems, safety device control systems, and vehicle monitoring systems. These systems do everything from alerting the driver to an open door to autonomously operating the vehicle on its own without driver intervention. In order to facilitate the operation of the vehicle, operational instructions must be delivered, verified, ordered, and executed. If the operational instructions are executed out of order or without having met all of the operational pre-requisites, the vehicle and any passengers could be at risk.

Thus, a need still remains for a computing system with message ordering mechanism to maintain vehicle capabilities in a changing environment. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a computing system including: transmitting an operational request; receiving an instruction event in response to the operational request; identifying an ordered sequence of the instruction event; loading an event hub with the ordered sequence of the instruction event; and executing the ordered sequence of the instruction event by a functional application including controlling the operation of a device.

An embodiment of the present invention provides a computing system including: a communication interface configured to: transmit an operational request, and receive an instruction event in response to the operational request; a device controller configured to: identify an ordered sequence of the instruction event, load an event hub with the ordered sequence of the instruction event, and execute the ordered sequence of the instruction event by a functional application includes controlling the operation of a device.

An embodiment of the present invention provides a non-transitory computer readable medium including instructions for a computing system, including: transmitting an operational request; receiving an instruction event in response to the operational request; identifying an ordered sequence of the instruction event; loading an event hub with the ordered sequence of the instruction event; and executing the ordered sequence of the instruction event by a functional application including controlling the operation of a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
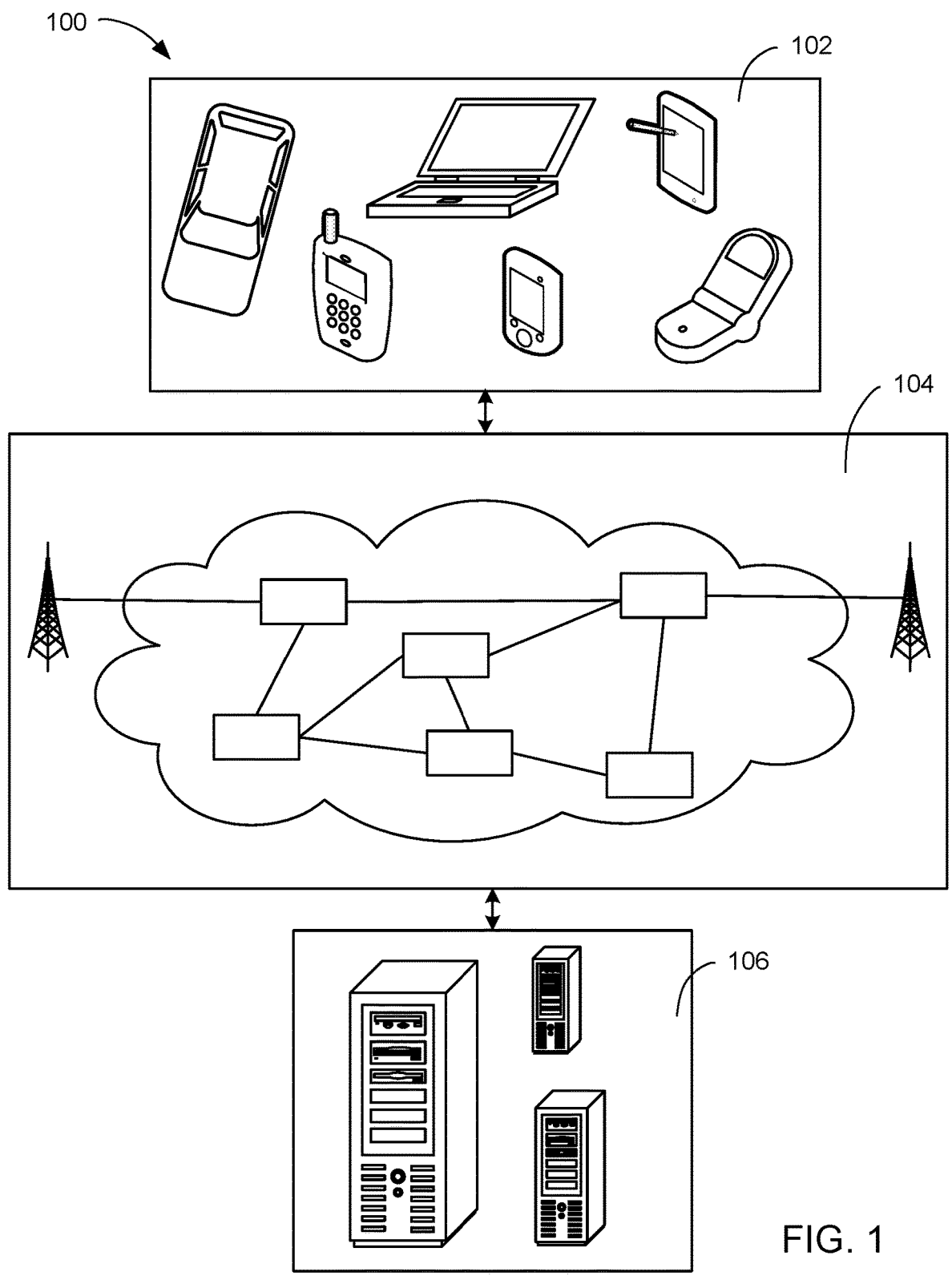
FIG. 1 is a computing system with message ordering mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software executed on a specific hardware platform, hardware, or a combination thereof in an embodiment of the present invention in accordance with the context in which the term is used. For example, the software can be machine code, firmware, embedded code, or application software. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits.

Referring now to FIG. 1, therein is shown a computing system 100 with message ordering mechanism in an embodiment of the present invention. The computing system 100 includes a first device 102, such as a client or a server, connected to a second device 106, such as a client or server. The first device 102 can communicate with the second device 106 through a communication path 104, such as a wireless or wired network.

For example, the first device 102 can be of any of a variety of wireless devices, such as a cellular phone, a notebook computer, a driver assisted vehicle, an autonomous vehicle, or other multi-functional wireless or entertainment device. The first device 102 can couple, either directly or indirectly, to the communication path 104 to communicate with the second device 106 or can be a stand-alone device.

For illustrative purposes, the computing system 100 is described with the first device 102 as a vehicle computing device, although it is understood that the first device 102 can be different types of devices. For example, the first device 102 can also be an automobile having a network of electronic components including a radio, a navigation system, communication system, a motor control system, a safety control system, and a central control system.

The second device 106 can be any of a variety of centralized or decentralized computing devices. For example, the second device 106 can be a multimedia computer, a laptop computer, a desktop computer, a server, grid-computing resources, a virtualized computer resource, cloud computing resource, peer-to-peer distributed computing devices, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, or embedded within a telecommunications network. The second device 106 can couple through the communication path 104 to communicate with the first device 102.

For illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wireless local area network (WLAN), wide area network (WAN), or a combination thereof.

Figure 2:
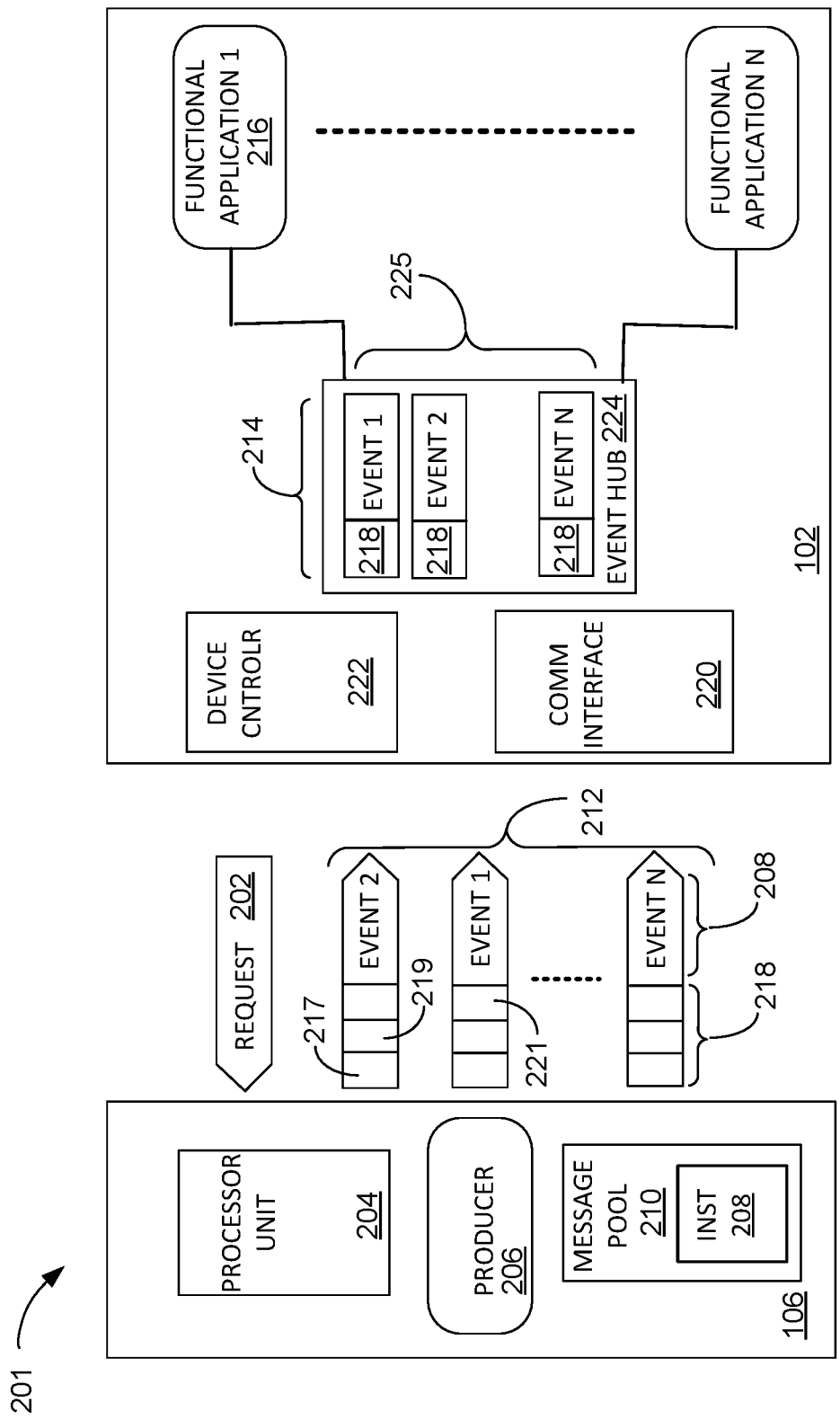
FIG. 2 is an example of an operation of the computing system of FIG. 1.

Referring now to FIG. 2, therein is shown an example of an operation 201 of the computing system 100 of FIG. 1. The example of an operation 201 of the computing system 100 depicts the first device 102, such as an autonomous automobile, in communication with the second device 106. The first device 102 can issue an operational request 202 to the second device 106 requesting operation instructions of the first device 102. The operational request 202 is a message sent from the first device 102 defining what operations will be utilized to control the first device 102 during a trip. The second device 106 can respond to the operational request 202 as a multithreaded transfer to the first device 102. The second device 106 can include a processor unit 204 that can pass the operational request 202 to a producer unit 206 for generation of instructions 208. The instructions 208 can represent various operations of the first device 102, including incremental steps used to complete specific operations for example start motor, navigate to point-of-interest (POI), or stop motor can each require a set of the instructions 208 to complete the task. It is understood that the operational request 202 can cause the second device 106 to generate instructions 208 that can include other functions of the first device 102 as well.

The producer unit 206 can deposit the instructions 208 in a message pool 210 for transfer to the first device 102. The message pool 210 can be a volatile or non-volatile memory configured to store the instructions 208 compiled in response to the operational request 202. The instructions 208, can implement a function of the first device 102 including operational control of the first device 102. The message pool 210 can receive the instructions 208 in any order, as provided by the producer unit 206. The producer unit 206 can generate the more complex instances of the instructions 208 prior to generating the simpler ones of the instructions 208. As the second device 106 transfers the instructions 208 in any order, it is the responsibility of the first device 102 to store and execute the instructions 208 in the proper order.

The first device 102 can request a multi-threaded transfer 212 of the instructions 208 from the second device 106 in order to expedite the delivery from the message pool 210. The instructions 208 can be packaged into instruction events 214, that group the instructions 208 into instruction strings for a specific one of a functional application 216. The instruction events 214 can be a list of the instructions 208 for executing the operation of the functional application 216. By way of an example, the functional application 216 can be a specific function such as start motor, which would also include testing and verifying sensors, assess the loading of the first device 102, and actually starting the motor (not shown). It is understood that other instruction sets can be included for the functional application 216.

By way of an example, each of the functional events 214 can include an information header 218 that can qualify the instruction events 214 for a specific one of the first device 102 and detail the order, which the instruction events 214, are to be delivered to the functional applications 216. As an example, one of the instruction events 214 might be to navigate to a specific point-of-interest, but that must be preceded by generating the route and starting the motor. As stated above, each of the instruction events 214 are designated to address only one of the functional applications 216 and must be executed in a specific order as provided in the information header 218.

The information header 218 can include an access key 217, identifying the destination device among multiple of the first device 102, a sequence number 219, identifying the numerical sequence in a plus one series of the instruction events 214, and a first missing sequence number 221 that defines where the initial sequence number of a string is missing. The information header 218 can be generated by the processor unit 204 of the second device 106. The information header 218 can be appended to the instructions 208 in order to make up the instruction events 214, when they are loaded into the message pool 210. It is understood that the second device 106 can provide instruction events 214 in any order, but the information header 218 can provide the destination and sequencing information required by the first device 102 to assure the correct order of execution by the functional applications 216 of the first device 102. The second device 106 can assemble the instruction events 214 including the information header 218 in order to assist the first device 102 in the ordering of the instruction events 214.

As the multi-threaded transfer 212 is processed by a communication interface 220 of the first device 102, a device controller 222 can read the information header 218 and load the instruction events 214 into an event hub 224 and establish the sequential order of execution of the instruction events 214. The event hub 224 can be volatile or non-volatile memory configured to store the instruction events 214 that have been sorted into an ordered sequence 225. The ordered sequence 225 can be derived from the information header 218, including loading the instruction events 214 in a numerical plus one order to define the sequence of execution. The device controller 222 can manage the release of the instruction events 214 from the event hub 224 to the functional applications 216 as appropriate to sustain continued operation of the first device 102. As previously stated, the device controller 222 would not release the start motor version of the instruction event 214 before loading the instruction event 214 that provides the next step, such as planning a route and navigating along the route. Once the instruction event 214 is released to first of the functional applications 216, such as start the motor, the device controller 222 can release the next one of the instruction events 214 in the sequence required to safely complete all of the functional applications 216, wherein an Nth version of the functional application 216 can include turning the motor off, as an example. It is understood that the device controller 222 would not release the Nth version of the functional application 216 to turn the motor off until the first device had completed the previous ones of the instruction event 214 and the first device 102 was parked at a destination to complete the operational request 202.

It is understood that the device controller 222 can begin execution of the instruction events 214 prior to having all of the instruction events 214 loaded in the event hub 224. This consideration can be based on the complexity of the instruction events 214 already loaded and the expected time for executing the instruction events 214 by the functional applications 216. In some cases, multiple of the functional applications 216 could execute the instruction events 214 in parallel, as they could support different processes executed by the functional applications 216. By way of an example, one of the functional applications 216 can provide traffic analysis for alternate route planning, while another of the functional applications 216 can follow the planned route of record. There can also be functional applications 216 to address communication or entertainment that can run along the entire route.

It is understood that the number and purpose of the functional applications 216 is not limited by the previous examples. The functional applications 216 are responsible for execution a specific function of the first device 102. In this way, any number of the functional applications 216 can be utilized to support trips around the block or trips across the country, without changing the definition of the functional applications 216, but some of the functional applications 216 might not be necessary for all trip types.

The first device 102 can apply machine learning to the request 202 in order to gauge the number of the functional applications 216 that will be used to satisfy the request. By way of an example, a trip to the grocery store might only involve four to six of the functional applications 216, while a trip to another state to visit a relative might require dozens of the functional applications 216. As the normal driving habits of the owner of the first device 102 become clearer, the number and type of the functional applications 216 can be predicted and when the execution of the instruction events 214 can be started.

It has been discovered that the computing system 100 can transmit the operational request 202 from the first device 102 to the second device 106. The first device 102 can receive the instruction events 214 in response to the operational request 202. The first device can perform a re-ordering of the instruction events 214 received from the second device 106 in order to identify the ordered sequence 225. By reading the information header 218 in the instruction events 214, the device controller 222 can process the multi-threaded transfer 212 from the second device 106 and establish the ordered sequence 225 in the event hub 224 of the first device 102. the first device 102 can execute the ordered sequence 225 by releasing the instruction event 214 to the functional application including controlling the operation of the first device 102. The device controller 222 can apply machine learning in order to estimate the number and type of the functional applications 216 that would be involved in satisfying the operational request 202 for travel.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

Figure 3:
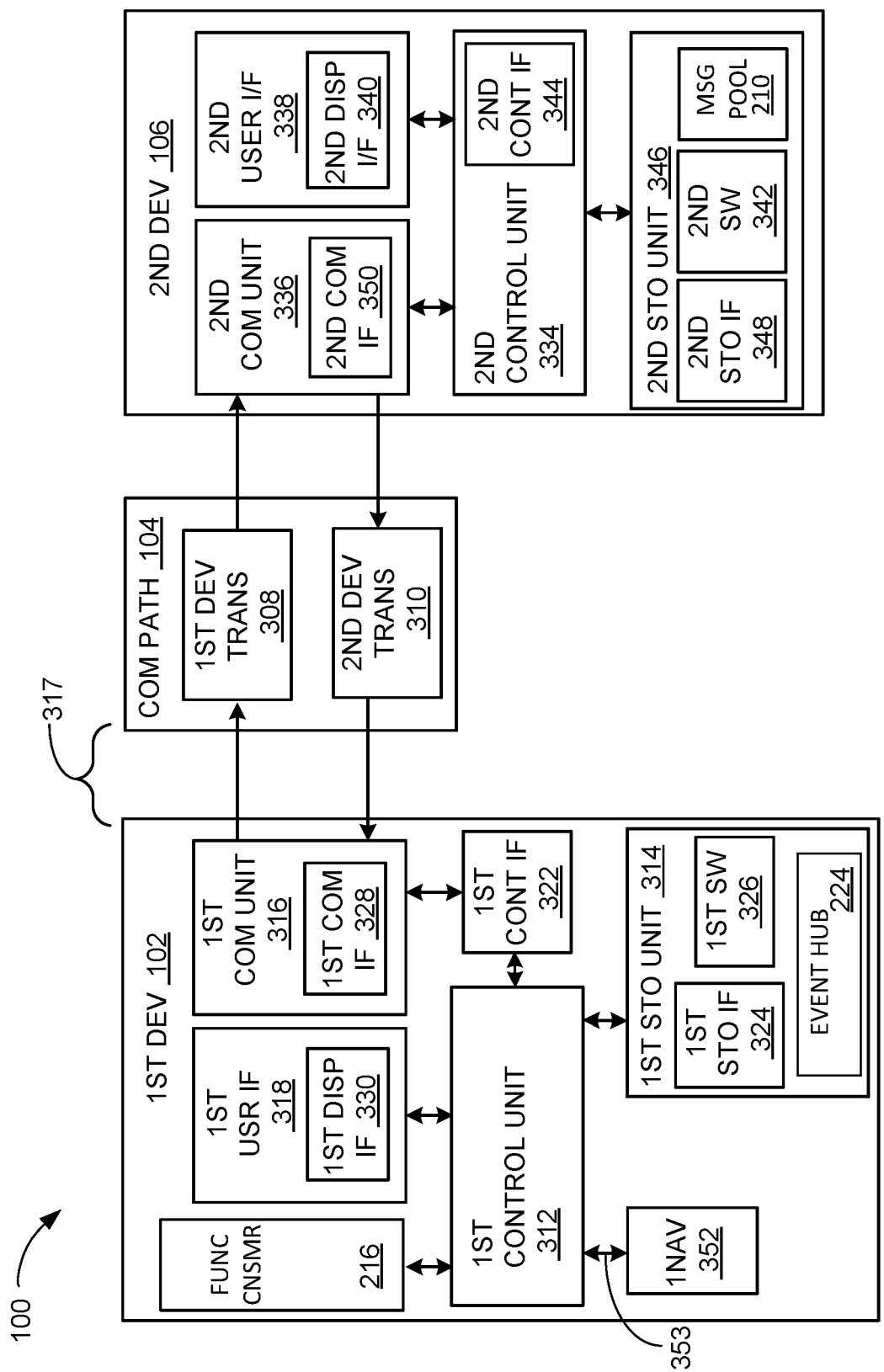
FIG. 3 is an exemplary hardware block diagram of the computing system.

Referring now to FIG. 3, therein is shown an exemplary hardware block diagram of the computing system 100. The computing system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the computing system 100 is shown with the first device 102 as a client device, although it is understood that the computing system 100 can have the first device 102 as a different type of device. For example, the first device 102 can be a mobile server having a number of clients including a display interface for displaying the relevant information.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide a portion of the intelligence of the computing system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, the notification packet 202 of FIG. 2, the update database 204 of FIG. 2, data representing previously presented image, sound files, coupons, advertisements, sale notices, favorite functions, directions, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between other functional units in the first device 102. The first storage interface 324 can also be used for communication that is external to the first device 102, such as external memory, solid state disk drives, or external hard disk drives.

The first storage interface 324 can receive information from the other functional units or from external sources, or can transmit information to the other functional units or to external destinations. The external sources and the external destinations refer to sources and destinations external to the first device 102 or temporarily housed within the first device 102 and can be removed.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104 a wireless channel 317 capable of the multi-threaded transfer 212 of FIG. 2.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can be configured to operate the first user interface 318 to display information generated by the computing system 100. The first control unit 312 can also execute the first software 326 for the other functions of the computing system 100. The first control unit 312 can further execute the first software 326 for interaction with the communication path 104 via the first communication unit 316 and the wireless channel 317. The first control unit 312 can further support the functional applications 216 by enabling transfer, of the instruction events 214 of FIG. 2, from the event hub 224 to the functional applications 216. It is understood that while the instruction events 214 are started sequentially, multiple of the functional applications 216 can execute concurrently as the functional applications 216 can support a function of the first device 102.

The second device 106 can be optimized for implementing an embodiment of the present invention in a multiple device embodiment with the first device 102. The second device 106 can provide the additional or higher performance processing power compared to the first device 102. The second device 106 can converge relevant information for several of the first device 102 in order to provide groups of targeted users of the first device 102 that share common categories of the relevant information. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the computing system 100. The second software 342 can operate in conjunction with the first software 326 to execute the modules of the computing system 100. The second control unit 334 can provide additional performance compared to the first control unit 312.

The second control unit 334 can operate the second user interface 338 to display information. The second control unit 334 can also execute the second software 342 for the other functions of the computing system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, the notification packet 202, the update database 204, or a combination thereof. The second storage unit 346 can be sized to provide the additional storage capacity to supplement the first storage unit 314. The second storage unit 346 can also receive input from other sources for delivery to the first device 102 through the communication path 104.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM). The second storage unit 346 can maintain the message pool 210, which holds the instruction events 214 for the first device 102 or multiple instances of the first device 102

The second storage unit 346 can include a second storage interface 348. The second storage interface 348 can be used for communication between other functional units in the second device 106. The second storage interface 348 can also be used for communication that is external to the second device 106. By way of an example, the second storage interface 348 can transfer the instruction events 214 from the second storage unit 346 to the first device 102.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

A first location unit 352 can determine a device location 353 of the first device 102 by communication with a global positioning satellite (not shown), cell tower triangulation, or a combination thereof. The device location 353 can be passed to the first control unit 312 for display on the first user interface 318 for presenting routing and destination information for the first device 102.

It will be understood that the modules of the first device 102 can be combined to operate as the functional applications 216 of the first device 102. For example, the client navigation module can be performed by combining the first control unit 312, the first location unit 352, the first storage unit 314, and the first user interface 318. The client entertainment module can be performed by combining the first control unit 312, the first storage unit 314, and the first user interface 318. The client safety module can be performed by combining the first control unit 312, the first communication interface 328, the first storage unit 314, and the first control interface 322, which is in control of switches and sensors throughout the first device 102. as these functions are combined they form the functional applications 216 that maintain the safety and the usability of the first device 102.

The first communication unit 316 can couple with the communication path 104 through the wireless channel 317 to send information to the second device 106 in the first device transmission 308 in the form of the request 202 of FIG. 2. The second device 106 can receive information in the second communication unit 336 from the first device transmission 308 of the communication path 104.

The second communication unit 336 can couple with the communication path 104 to send the instruction events 214 to the first device 102 in the second device transmission 310 through the wireless channel 317. The first device 102 can receive the instruction events 214 in the first communication unit 316 from the second device transmission 310 of the communication path 104. The computing system 100 can be supported by the first control unit 312, the second control unit 334, dedicated hardware modules, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100.

It has been discovered that the first device 102 can respond to the instruction events 214 through the communication path 104 without intervention by the user of the first device 102. The first control unit 312 and the second control unit 334 can execute portions of the transfer of the instruction events 214 without the assistance of the user of the first device 102 by performing the multi-threaded transfer 212 of FIG. 2 as the first device 102 communicates with the second device 106, while on route to a destination. The first control unit 312 can cause the first communication interface 328 to send the operational request 202 through the network 104 to the second device 106. The communication interface 328 can also receive the instruction event 214 in response to the operational request 202. The first control unit 312 can identify the ordered sequence 225 of the instruction event 214. The event hub 224 can be loaded with the instruction event 214 in the ordered sequence 225. The ordered sequence 225 of the instruction event 214 can be executed by the functional applications 216 for controlling the first device 102 in order to satisfy the operational request 202.

Figure 4:
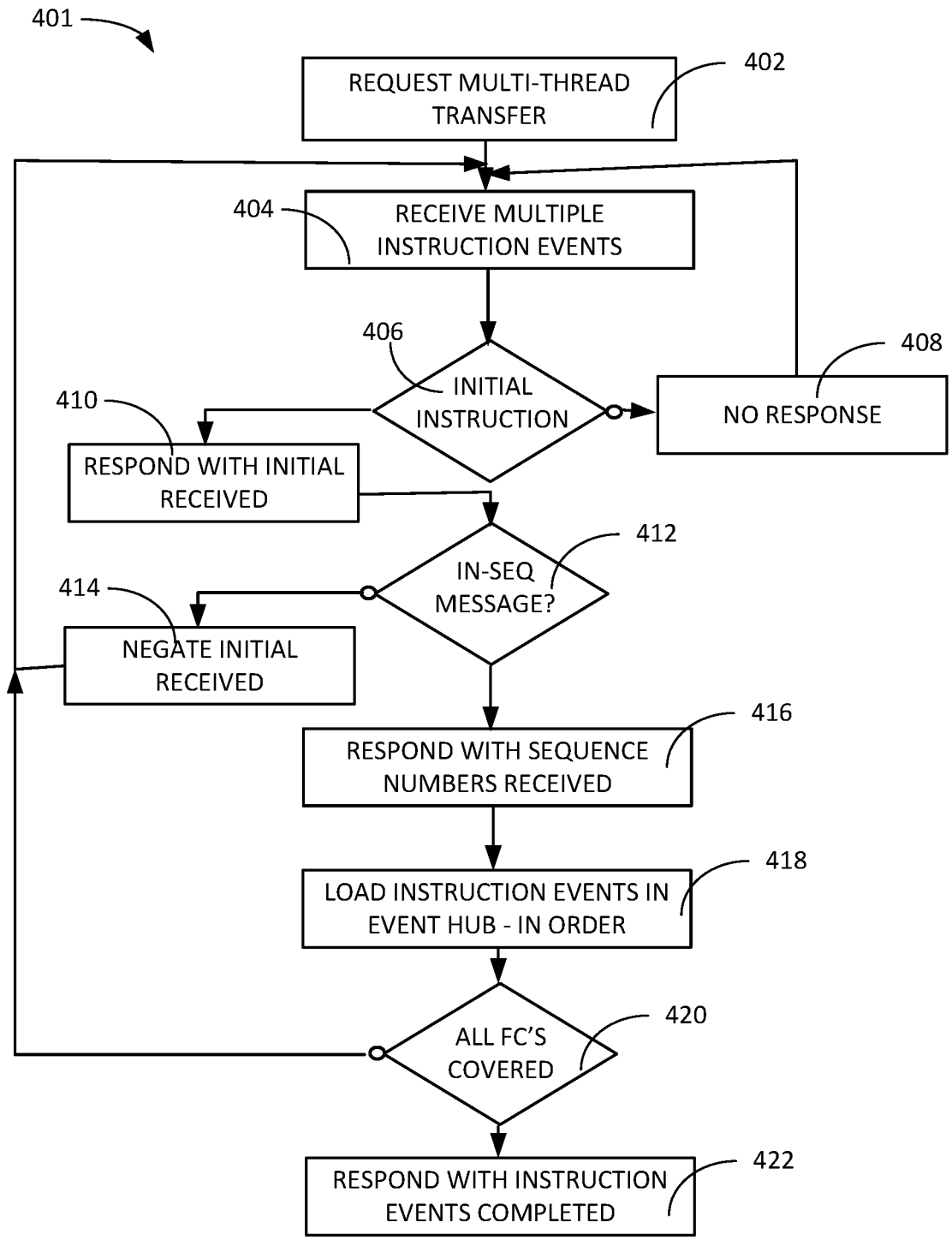
FIG. 4 is a control flow of the computing system of FIG. 1.

Referring now to FIG. 4, therein is shown a control flow 401 of the computing system 100 of FIG. 1. The control flow 401 of the computing system 100 depicts a request for multi-threaded transfer 402, in which the first device 102 of FIG. 1 requests support for an activity to be delivered in a multi-threaded transfer 212 of FIG. 2. The activity requested by the first device 102 can be a trip to the store or across-country vacation. The second device 106 of FIG. 1 can compile the required information to support the request of the first device 102. The second device also assembles the instruction events 214 of FIG. 2 including the information header 218 of FIG. 2 for each of the instruction events 214.

The first device 102 can wait in a receive multiple instruction events 404 to receive the instruction events 214 in the multi-threaded transfer 212. Since the second device 106 can assemble the instruction events 214 in any order, the first device 102 must rely on the information header 218 to maintain the correct order of execution. It is understood that several of the functional applications 216 of FIG. 2 can be running concurrently in the first device 102, but it is imperative that the order of execution initiation must be maintained. By way of an example, attempting to traverse a planned route without starting the motor first, will not work. As the first device 102 processes the instruction events 214, the information header 218 can provide sufficient information to allow the first device 102 to identify the sequence number 219 and the first missing sequence number 221 for processing.

As the first device 102 processes the multi-threaded transfer 212, an initial instruction check 406 can be performed. If the initial instruction check 406 does not detect the instruction event 214 with the initial sequence number, the decision moves to a no response block 408 and the first device 102 will wait for the multi-threaded transfer 212 to deliver the next set of the instruction events 214. If however the initial instruction check 406 does detect the instruction event 214 with the initial sequence number, the flow moves to a respond with initial received 410. The response of the initial received can be sent to the second device 106 for accounting purposes. It is understood that the initial sequence number and start as zero ("0"), but as the instruction events 214 having the sequential numbers are detected, the initial sequence number can be altered to first sequence number that has not yet been loaded in the event hub 224.

The flow moves to an ordered sequence check 412 to identify whether the ordered sequence 225 of the instruction events 214 has been received. The ordered sequence 225 of the instruction events 214 can be a series of the instruction events 214 having the sequence number 219 of the information header 218 in sequential plus one order. By way of an example, if the initial sequence number 219 in the information header 218 can be "W" the ordered sequence numbers would be in a plus one order indicating "W+1", "W+2", "W+3", etc. If the multi-threaded transfer 212 does not include the ordered sequence 225 of the instruction events 214, as identified by the sequence number 219 in the information header 218, the flow moves to a negate initial received block 414. The negate initial received block 414 can reset the status that the instruction event 214 including the sequence number zero has been received. The flow then returns to the receive multiple instruction events 404 in order to await the next occurrence of the multi-threaded transfer 212, If the ordered sequence check 412 does identify multiple of the instruction events 214 that represent the ordered sequence 225 of the instruction events 214, as identified by the sequence number 219 in the information header 218, the flow proceeds to a respond with sequence numbers received block 416. The respond with sequence numbers received block 416 can transmit the sequence numbers 219 of the instruction events 214 that make-up the ordered sequence 225. In response to the respond with sequence numbers received block 416 being received by the second device 106, the instruction events 214 listed in the respond with sequence numbers received block 416 can be removed from the message pool 210.

The flow then proceeds to a load instruction events in event hub block 418 in order to load the instruction events 214 in the event hub 224 of FIG. 2 in the order presented by the sequence number 219 in the information header 218. Once the instruction events 214 are loaded in the event hub 224, the first device 102 can decide whether execution of the instruction events 214 can initiate execution.

The flow then proceeds to an all functional applications covered decision 420. If it is determined that there are still the functional applications 216 that are not represented by the instruction events 214 the flow will return to the receive multiple instruction events 404 to retrieve more of the instruction events 214. By way of an example, if the load instruction events in event hub block 418 identified that the instruction events 214 having sequence numbers 0 through 3 have been loaded into the event hub 224, the first empty sequence number would be set to four "4", as the initial sequence number 219 in the information header 218. In the case that the all functional applications covered decision 420 identifies that all of the instruction events 214 required for the operational request 202 have been transferred and stored in the event hub 224, the flow proceeds to a respond with instruction events completed block 422. The respond with instruction events completed block 422 can send a response from the first device 102 to the second device 106 indicating that all of the instruction events 214 identified by the access key 217, identifying the destination device among multiple of the first device 102, can be removed from the message pool 210.

It has been discovered that the computing system 100 provides an efficient means to transfer the instruction events 214 from the second device 106 to the first device 102, while maintaining the ordered sequence 225 of the instruction events 214. While the ordered sequence 225 of the instruction events 214 can be preserved, there is no requirement on the size or number of the instructions 208 of FIG. 2 that make up each of the instruction events 214 in order to satisfy the functional applications 216 or the number of the functional applications 216 required for the operational request 202. Since the sorting of the instruction events 214 and loading of the event hub 224 are based on the information header 218, there is no size restrictions on the instruction events 214.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

Figure 5:
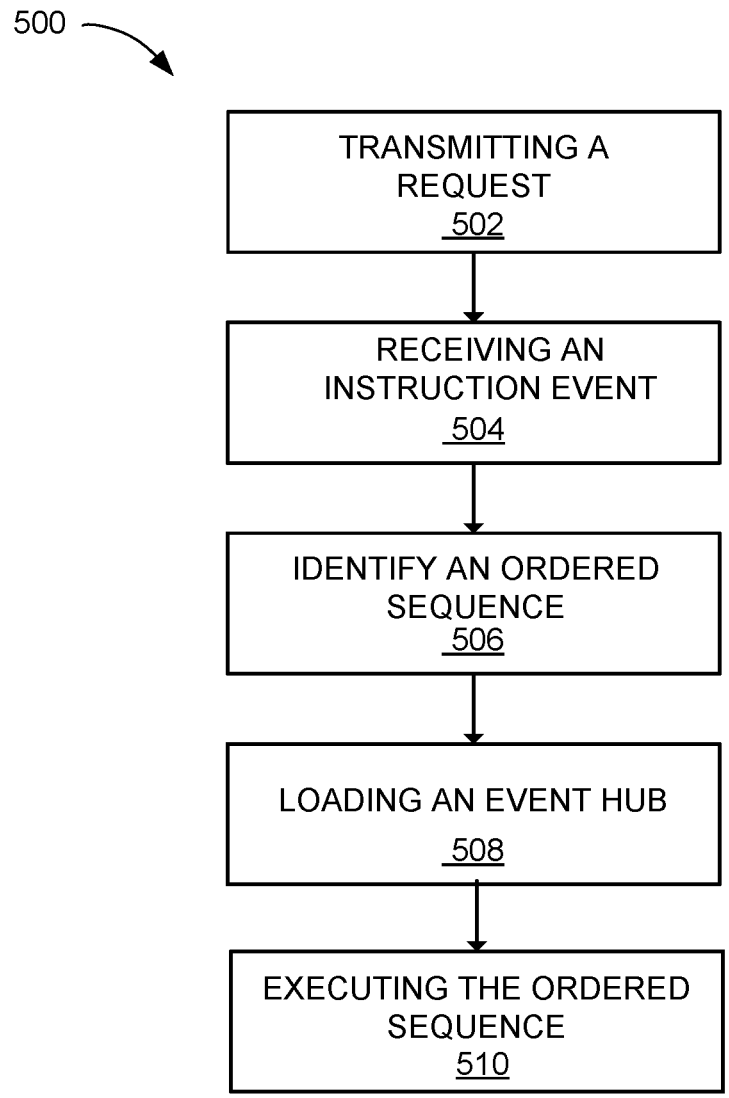
FIG. 5 is a flow chart of a method of operation of a computing system in an embodiment of the present invention.

Referring now to FIG. 5, therein is shown a flow chart of a method 500 of operation of a computing system 100 in an embodiment of the present invention. The method 500 includes: transmitting an operational request in a block 502; receiving an instruction event in response to the operational request in a block 504; identifying an ordered sequence of the instruction event in a block 506; loading an event hub with the ordered sequence of the instruction event in a block 508; and executing the ordered sequence of the instruction event by a functional application including controlling the operation of a device in a block 510.

The method 500 of operation of the computing system 100 also includes: receiving an update database in a block 510; assembling a notification packet for the update database including: generating a transfer key code for accessing the update database, encrypting, with an encryption seed, the update database, and providing a database size for the update database in a block 512; and transferring the notification packet to a device in a block 514.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method for managing message priority and sequencing in an automotive computing system, the method comprising:

transmitting an operational request includes initiating an operation to control a device including receiving a response including an instruction to start motor;
receiving an instruction event in response to the operational request, wherein receiving the instruction event includes receiving a multi-threaded transfer;
identifying an ordered sequence of the instruction event;
in response to the identifying include multiple ordered sequence of the instruction events, loading an event hub with the ordered sequence of the instruction events;
in response to identifying that all of the instruction events required for the operational request have been transferred and stored in the event hub, responding with a completion response from the device indicating that all of the instruction events identified by an access key have completed; and
executing the ordered sequence of the instruction event by a functional application including controlling the operation of the device.

2. The method as claimed in claim 1 wherein identifying the ordered sequence includes identifying the information event with a sequence number in a plus one order of an information header.

3. The method as claimed in claim 1 wherein executing the ordered sequence of the instruction event by the functional application includes providing the instruction event with instructions to start a motor of the device.

4. The method as claimed in claim 1 wherein loading the event hub includes storing the instruction event including instructions for each of the functional applications in the ordered sequence.

5. A method as claimed in claim 1 wherein executing the ordered sequence of the instruction event by the functional application includes executing a start motor, a plan route to destination, drive to destination, or stop motor.

6. The method as claimed in claim 1 wherein executing the ordered sequence of the instruction event includes instructions to execute the functional application.

7. An automotive computing system for managing message priority and sequencing, the automotive computing system comprising:
a communication interface configured to:
transmit an operational request including an operation initialized to control a device includes a response with an instruction to start motor received, and
receive an instruction event in response to the operational request, wherein receiving the instruction event includes receiving a multi-threaded transfer;
a device controller configured to:
identify an ordered sequence of the instruction event,
in response to the identifying include multiple ordered sequence of the instruction events, load an event hub with the ordered sequence of the instruction events,
in response to identifying that all of the instruction events required for the operational request have been transferred and stored in the event hub, responding with a completion response from the device indicating that all of the instruction events identified by an access key have completed;
and execute the ordered sequence of the instruction event by a functional application includes controlling the operation of the device.

8. The automotive computing system as claimed in claim 7 wherein the device controller is further configured to identify the ordered sequence by the information event identified with a sequence number in a plus one order of an information header.

9. The automotive computing system as claimed in claim 7 wherein the device controller configured to execute the ordered sequence of the instruction event by the functional application includes the instruction event provided with instructions to start a motor of the device.

10. The automotive computing system as claimed in claim 7 wherein the device controller configured to load the event hub includes storing the instruction event including instructions required for each of the functional applications in the ordered sequence.

11. The automotive computing system as claimed in claim 7 wherein the device controller configured to execute the ordered sequence of the instruction event by the functional application includes executing a start motor, a plan route to destination, drive to destination, or stop motor.

12. The automotive computing system as claimed in claim 7 wherein the device controller configured to execute the functional application includes the instruction event including instructions executed from the ordered sequence.

13. A non-transitory computer readable medium including instructions for an automotive computing system to manage message priority and sequencing, the automotive computing system comprising:
transmitting an operational request includes initiating an operation to control a device including receiving a response including an instruction to start motor;
receiving an instruction event in response to the operational request, wherein receiving the instruction event includes receiving a multi-threaded transfer;
identifying an ordered sequence of the instruction event;
in response to the identifying include multiple ordered sequence of the instruction events, loading an event hub with the ordered sequence of the instruction events;
in response to identifying that all of the instruction events required for the operational request have been transferred and stored in the event hub, responding with a completion response from the device indicating that all of the instruction events identified by an access key have completed; and
executing the ordered sequence of the instruction event by a functional application including controlling the operation of the device.

14. The non-transitory computer readable medium including the instructions as claimed in claim 13 wherein identifying the ordered sequence includes identifying the information event with a sequence number in a plus one order of an information header.

15. The non-transitory computer readable medium including the instructions as claimed in claim 13 wherein executing the ordered sequence of the instruction event by the functional application includes providing the instruction event with instructions required to start a motor of the device.

16. The non-transitory computer readable medium including the instructions as claimed in claim 13 wherein loading the event hub includes storing the instruction event including instructions required for each of the functional applications in the ordered sequence.

17. The non-transitory computer readable medium including the instructions as claimed in claim 13 wherein executing the ordered sequence of the instruction event by the functional application includes executing a start motor, a plan route to destination, drive to destination, or stop motor.

* * * * *